United States Patent
Misawa et al.

(10) Patent No.: US 10,505,362 B2
(45) Date of Patent: Dec. 10, 2019

(54) WIRELESS POWER RECEIVING DEVICE

(71) Applicant: Toyota Jidosha Kabushiki Kaisha, Toyota-shi, Aichi-ken (JP)

(72) Inventors: Takahiro Misawa, Okazaki (JP); Toshiya Hashimoto, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/029,077

(22) Filed: Jul. 6, 2018

(65) Prior Publication Data
US 2019/0044321 A1    Feb. 7, 2019

(30) Foreign Application Priority Data

Aug. 2, 2017 (JP) .................. 2017-149812

(51) Int. Cl.
| | | |
|---|---|---|
| H02J 7/02 | (2016.01) | |
| H02H 7/125 | (2006.01) | |
| H02J 50/12 | (2016.01) | |
| H02J 50/80 | (2016.01) | |
| B60L 53/12 | (2019.01) | |
| H02J 7/00 | (2006.01) | |
| H02J 50/10 | (2016.01) | |
| H02H 7/18 | (2006.01) | |

(52) U.S. Cl.
CPC ........... *H02H 7/1257* (2013.01); *B60L 53/12* (2019.02); *H02H 7/1255* (2013.01); *H02J 7/0029* (2013.01); *H02J 7/025* (2013.01); *H02J 50/10* (2016.02); *H02J 50/12* (2016.02); *H02J 50/80* (2016.02); *H02H 7/18* (2013.01)

(58) Field of Classification Search
CPC combination set(s) only.
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — Daniel Kessie
(74) *Attorney, Agent, or Firm* — Dinsmore & Shohl LLP

(57) ABSTRACT

A power receiving device includes: a power receiving unit configured to wirelessly receive power from a power transmitting unit of a power transmitting device; a rectifier circuit; a charging relay provided between the rectifier circuit and the power storage device; a voltage sensor configured to sense a voltage applied from the power receiving unit to the rectifier circuit; and a charging ECU configured to wirelessly communicate with the power transmitting device via a communication device. After wireless communication with the power transmitting device is established before a power request is output to the power transmitting device, the charging ECU closes the charging relay and also performs a short-circuit determination process, by using a value of a voltage sensed by the voltage sensor with the charging relay closed, to determine whether the rectifier circuit has a short circuit fault.

3 Claims, 5 Drawing Sheets

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2016/0075240 A1* | 3/2016 | Inoue ................. H02J 50/10 320/108 |
| 2019/0157907 A1* | 5/2019 | Sugiyama ............ H02J 50/12 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| JP | 2016-067149 A | 4/2016 |
| KR | 20080031398 A | 4/2008 |
| KR | 20100015954 A | 2/2010 |
| WO | 2007008646 A2 | 1/2007 |
| WO | 2008118178 A1 | 10/2008 |

* cited by examiner

WIRELESS POWER RECEIVING DEVICE

CROSS-REFERENCE TO RELATED APPLICATIONS

This nonprovisional application claims priority to Japanese Patent Application No. 2017-149812 filed on Aug. 2, 2017 with the Japan Patent Office, the entire contents of which are hereby incorporated by reference.

BACKGROUND

Field

The present disclosure relates to a wireless power receiving device that receives power from a power transmitting device wirelessly, and more particularly, to a wireless power receiving device including a rectifier circuit that rectifies received power and outputs the rectified power to a power storage device.

Description of the Background Art

Japanese Patent Laying-Open No. 2016-067149 discloses a power transfer system comprising a power transmitting device having a power transmitting unit that wirelessly transmits alternating-current power and a power receiving device having a power receiving unit that wirelessly receives power transmitted from the power transmitting unit. In addition to the power receiving unit, the power receiving device provided in the power transfer system further includes a rectifier circuit that rectifies the power received by the power receiving unit and outputs the rectified power to a power storage device, a charging relay provided between the rectifier circuit and the power storage device, and a controller configured to wirelessly communicate with the power transmitting device. The controller of the power receiving device is configured such that once a wireless communication with the power transmitting device has been established, the controller of the power receiving device closes the charging relay and requests the power transmitting device to transmit power, and determines whether the charging relay is faulty from the voltage of the power transmitting device and the voltage of the power receiving device while the power transmitting device transmits power.

SUMMARY

When the power receiving device includes a rectifier circuit, and the rectifier circuit has a short circuit fault and in that condition the power receiving unit of the power receiving device receives power from the power transmitting device, an excessive current flows between the power receiving unit and the rectifier circuit, which may have an effect to cause a component other than the rectifier circuit (for example, the power receiving unit) to also fail. Accordingly, it is desirable to determine whether the rectifier circuit has a short circuit fault before the power receiving unit receives power from the power transmitting device. However, Japanese Patent Laying-Open No. 2016-067149 does not at all refer to such a problem or any countermeasure against it.

The present disclosure has been made to solve the above problem, and an object thereof is to provide a wireless power receiving device including a rectifier circuit, that can prevent a component other than the rectifier circuit from failing as the rectifier circuit has a short circuit fault.

(1) According to the present disclosure, a wireless power receiving device comprises: a power receiving unit configured wirelessly receive power from a power transmitting unit of a power transmitting device; a rectifier circuit configured to rectify the power received by the power receiving unit and output the rectified power to a power storage device; a charging relay provided between the rectifier circuit and the power storage device; a voltage sensor configured to sense a voltage on a power line between the power receiving unit and the rectifier circuit; and a controller configured to wirelessly communicate with the power transmitting device via a communication device. The controller is configured to, after wireless communication with the power transmitting device is established before a power transmission request signal as a signal for requesting the power transmitting device to transmit power is output to the power transmitting device, close the charging relay, and also perform a short-circuit determination process, by using a value of a voltage sensed by the voltage sensor with the charging relay closed, to determine whether the rectifier circuit has a short circuit fault.

The controller configured as above determines whether the rectifier circuit has a short circuit fault before a power transmission request signal is transmitted to the power transmitting device. Thus whether the rectifier circuit has a short circuit fault can be determined in a state in which the power receiving unit does not receive power from the power transmitting device. When determining whether the rectifier circuit has a short circuit fault, if the rectifier circuit should have a short circuit fault, a component other than the rectifier circuit (such as the power receiving unit) can be prevented from failing as the rectifier circuit has the short circuit fault.

(2) In one embodiment, the controller is configured to: when it is determined through the short-circuit determination process that the rectifier circuit has a short circuit fault, open the charging relay without outputting the power transmission request signal to the power transmitting device. The controller is configured to: when it is not determined through the short-circuit determination process that the rectifier circuit has a short circuit fault, output the power transmission request signal to the power transmitting device while keeping the charging relay closed.

The controller configured as above closes the charging relay and performs the short circuit determination process after wireless communication with the power transmitting device is established, and when it is not determined that the rectifier circuit has a short circuit fault, the controller keeps the charging relay closed even after the short circuit determination process is completed, while the controller outputs a power transmission request signal to the power transmitting device to start charging the power storage device. This allows the charging relay to be operated less frequently than when the charging relay is re-opened whenever the short-circuit determination process is completed. This allows the charging relay to have an increased lifetime.

(3) In one embodiment, The controller is configured to: after wireless communication with the power transmitting device is established, perform a final compatibility check to obtain compatibility information of the power transmitting device from the power transmitting device and to determine whether receiving power from the power transmitting device is allowed; and after it is determined through the final compatibility check that receiving power is allowed, close the charging relay to perform the short circuit determination process.

Even after wireless communication is established between the power transmitting device and the power receiving device, receiving power cannot be started unless it is determined through the final compatibility check that receiving power is allowed. If the short-circuit determination process is performed before the final compatibility check and it is determined through the short-circuit determination process that the rectifier circuit does not have a short circuit fault, and thereafter the final compatibility check is performed and it is determined therethrough that receiving power is not allowed, then, the charging relay once closed for the short-circuit determination process needs to be re-opened and would thus be operated more frequently.

In view of this, the controller configured as above closes the charging relay to perform the short-circuit determination process after wireless communication with the power transmitting device is established and it is also determined through the final compatibility check that receiving power is allowed. This allows the charging relay to be operated less frequently than when the short-circuit determination process is performed before the final compatibility check.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The present disclosure will now be described in embodiments hereinafter in detail with reference to the drawings. In the figures, identical or corresponding components are identically denoted and will not be described repeatedly.

Configuration of Power Transfer System

Figure 1:
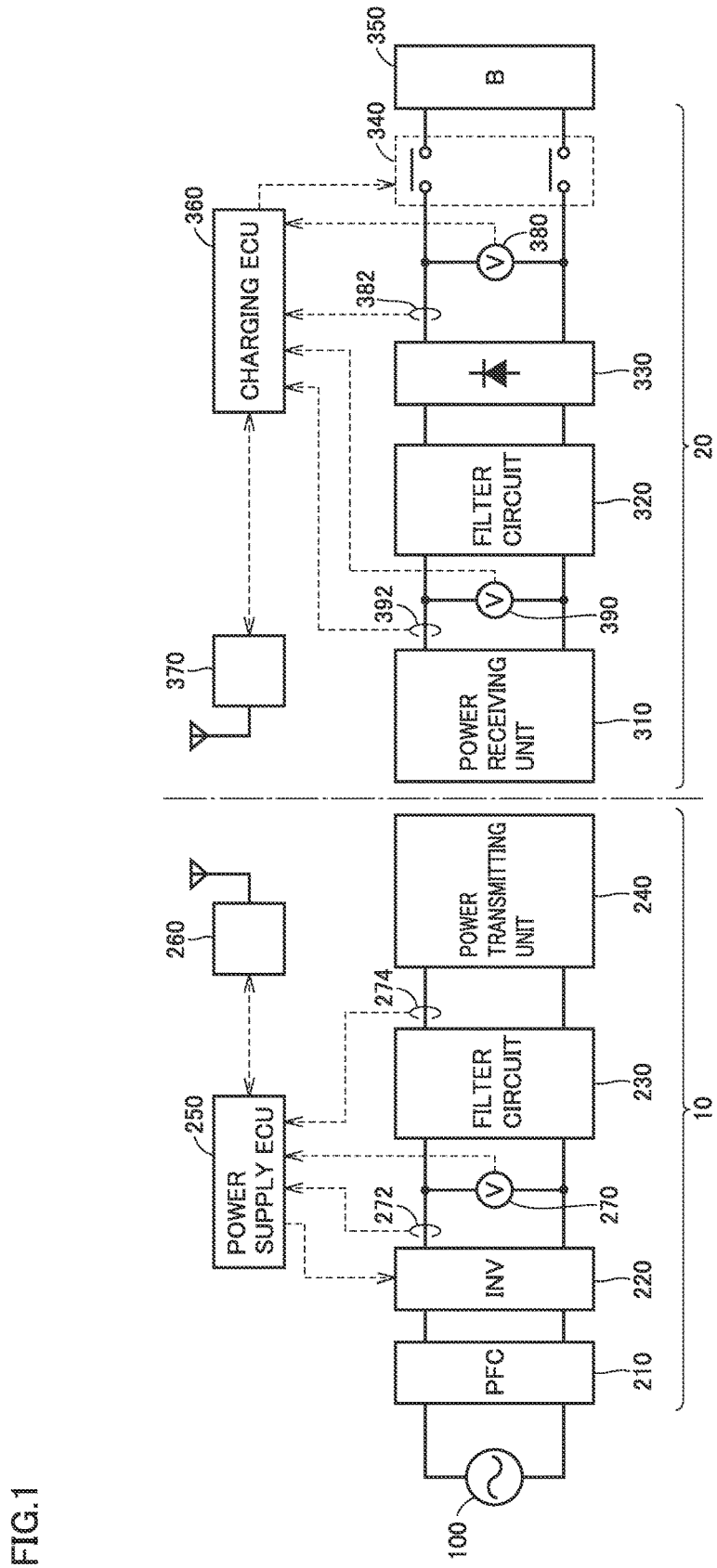
FIG. 1 generally shows a configuration of a wireless power transfer system.

FIG. 1 generally shows a configuration of a wireless power transfer system including a power receiving device 20 according to the present embodiment. The power transfer system comprises a power transmitting device 10 and power receiving device 20. For example, power receiving device 20 can be mounted in a vehicle or the like that can travel by using electric power supplied from power transmitting device 10 and stored.

Power transmitting device 10 includes a power factor correction (PFC) circuit 210, an inverter 220, a filter circuit 230, and a power transmitting unit 240. Furthermore, power transmitting device 10 further includes a power supply ECU (Electronic Control Unit) 250, a communication unit 260, a voltage sensor 270, and current sensors 272 and 274.

PFC circuit 210 can receive alternating-current (AC) power from an AC-power supply 100 (e.g., a grid power supply), rectify and increase the power in voltage, and supply the power to inverter 220, and PFC circuit 210 can also bring an input current close to a sinusoidal wave to correct a power factor. PFC circuit 210 can be a variety of types of known PFC circuits. Note that in place of PFC circuit 210, a rectifier which does not have a power factor correcting function may be used.

Inverter 220 is controlled by power supply ECU 250, and receives a direct-current (DC) power from PFC circuit 210 and converts the received DC power to (AC) power having a prescribed frequency (for example of several tens of kHz) to be transmitted. Inverter 220 can change a switching frequency in response to a control signal received from power supply ECU 250 to adjust a frequency of a power to be transmitted.

Filter circuit 230 is provided between inverter 220 and power transmitting unit 240 and suppresses harmonic noise, generated from inverter 220. Filter circuit 230 is composed for example of an LC filter including a coil and a capacitor.

Power transmitting unit 240 receives from inverter 220 through filter circuit 230 AC power (or power to be transmitted) having a transmission frequency, and transmits the power to power receiving unit 310 of power receiving device 20 wirelessly through an electromagnetic field generated around power transmitting unit 240. Power transmitting unit 240 for example includes a resonance circuit for transmitting power to power receiving unit 310 wirelessly.

Voltage sensor 270 senses a voltage output from inverter 220 and outputs a value of the sensed voltage to power supply ECU 250. Current sensor 272 senses a current output from inverter 220 and outputs a value of the sensed current to power supply ECU 250. Based on the values of voltage sensor 270 and current sensor 272, the power supplied from inverter 220 to power transmitting unit 240 to be transmitted (that is, the power output from power transmitting unit 240 to power receiving device 20) can be sensed. Current sensor 274 senses a current flawing to power transmitting unit 240 and outputs a value of the sensed current to power supply ECU 250.

In sensing the power to be transmitted, current sensor 274 may be used instead of current sensor 272, or the power to be transmitted may be calculated by sensing a voltage and a current on a DC line between PFC circuit 210 and inverter 220.

Power supply ECU 250 includes a CPU (Central Processing Unit), a storage device, an input/output buffer, and the like, none of which is shown, and receives signals from various sensors and devices and controls various devices in power transmitting device 10.

As an example, power supply ECU 250 controls switching of inverter 220 to allow inverter 220 to generate (AC) power to be transmitted. Note that each type of control is not necessarily processed by software, and can also be processed by dedicated hardware (or electronic circuitry).

Power supply ECU 250 during power transmission to power receiving device 20 adjusts a duty of a voltage that is output from inverter 220 to control a power to be transmitted to be a target power. The output voltage's duty is defined as a ratio of a positive (or negative) voltage output time to a period of an output voltage waveform (a rectangular wave). A duty of a voltage output from the inverter can be adjusted by changing a timing of operating a switching element of inverter 220. The target power can be generated, for example, based on a power receiving state of power receiving device 20.

Furthermore, power supply ECU 250 during power transmission to power receiving device 20 can adjust a driving frequency of inverter 220 to adjust a frequency of a power to be transmitted. A frequency of a power to be transmitted that is adjusted to have an appropriate value allows more efficient power transfer from power transmitting device 10 to power receiving device 20.

Communication unit 260 is configured to wirelessly communicate with communication unit 370 of power receiving device 20, and receives from power receiving device 20 a target value of a power to be transmitted (or a target power) and also communicates with power receiving device 20 information of starting/stopping power transmission, a power receiving state of power receiving device 20, etc.

Hereinafter, power receiving device 20 will be described. Power receiving device 20 includes power receiving unit 310, a filter circuit 320, a rectifier circuit 330, a charging relay 340, and a power storage device 350. Furthermore, power receiving device 20 further includes a charging ECU 360, a communication unit 370, voltage sensors 380, 390, and current sensors 382, 392.

Power receiving unit 310 wirelessly receives (AC) power output from power transmitting unit 240 of power transmitting device 10. Power receiving unit 310 for example includes a resonance circuit for receiving power from power transmitting unit 240 wirelessly. Power receiving unit 310 outputs the received power to rectifier circuit 330 through filter circuit 320.

Filter circuit 320 is provided between power receiving unit 310 and rectifier circuit 330, and suppresses harmonic noise generated when receiving power. Filter circuit 320 is composed for example of an LC filter including an inductor and a capacitor.

Rectifier circuit 330 rectifies AC power received by power receiving unit 310 and outputs the rectified power to power storage device 350. Rectifier circuit 330 is composed of, for example, a diode bridge circuit including a plurality of diodes.

Power storage device 350 is a rechargeable DC power supply, and for example includes a lithium-ion or nickel metal hydride battery or a similar secondary battery. Power storage device 350 stores power output from rectifier circuit 330. Then, power storage device 350 supplies the stored power to a load driving device or the like (not shown). Note that a capacitor having a large capacitance can also be adopted as power storage device 350.

Charging relay 340 is provided between rectifier circuit 330 and power storage device 350 and opened/closed in response to a control signal received from charging ECU 360. When charging relay 340 is closed, rectifier circuit 330 and power storage device 350 are electrically interconnected. When charging relay 340 is opened, rectifier circuit 330 and power storage device 350 are electrically disconnected.

Voltage sensor 380 senses a voltage output from rectifier circuit 330 (or a voltage on a power line between rectifier circuit 330 and charging relay 340) and outputs a value of the sensed voltage to charging ECU 360. Current sensor 382 senses a current output from rectifier circuit 330 (or a current on a power line between rectifier circuit 330 and charging relay 340) and outputs a value of the sensed current to charging ECU 360. Based on the values of voltage sensor 380 and current sensor 382, charging ECU 360 can sense power received by power receiving unit 310 (i.e., power charged to power storage device 350).

Voltage sensor 390 senses a voltage output front power receiving unit 310 (or a voltage on a power line between power receiving unit 310 and filter circuit 320) and outputs a value of the sensed voltage to charging ECU 360. Current sensor 392 senses a current output from power receiving unit 310 (a current flowing through a power line between power receiving unit 310 and filter circuit 320, that is, a current input from power receiving unit 310 to rectifier circuit 330) and outputs a value of the sensed current to charging ECU 360. Charging ECU 360 can sense received power (or power charged) based on the values of voltage sensor 390 and current sensor 392, rather than those of voltage sensor 380 and current sensor 382.

Charging ECU 360 includes a CPU, a storage device, an input/output buffer, and the like, none of which is shown, and receives signals from various sensors and devices and also controls various types of devices in power receiving device 20. Note that each type of control is not necessarily processed by software, and can also be processed by dedicated hardware (or electronic circuitry).

While receiving power from power transmitting device 10, charging ECU 360 generates a target value of power in power transmitting device 10 to be transmitted (a target power) so that power receiving device 20 receives power of a desired target value. Specifically, based on a deviation between a value of received power as sensed and the target value, charging ECU 360 generates a target value of power in power transmitting device 10 to be transmitted. Then, charging ECU 360 transmits the generated target value of power to be transmitted (or the target power) to power transmitting device 10 by communication unit 370.

Communication unit 370 is configured to wirelessly communicate with communication unit 260 of power transmitting device 10, and transmits to power transmitting device 10 the target value of power to be transmitted that is generated in charging ECU 360 (or the target power) and also communicates with power transmitting device 10 information of starting/stopping power transfer, transmits a power receiving state of power receiving device 20 to power transmitting device 10, etc.

In this power transfer system, (AC) power to be transmitted is supplied from inverter 220 through filter circuit 230 to power transmitting unit 240. Power transmitting unit 240 and power receiving unit 310 each include a coil and a capacitor and are designed to resonate at a transmission frequency. In some embodiments, the power transmitting unit 240 and power receiving unit 310 have a resonance strength, which is indicated by a Q value of 100 or more.

In power transmitting device 10, when power to be transmitted is supplied from inverter 220 to power transmitting unit 240, energy (or power) moves from power transmitting unit 240 to power receiving unit 310 through an electromagnetic field formed between the coil of power transmitting unit 240 and the coil of power receiving unit 310. The energy (or power) moved to power receiving unit 310 is supplied to power storage device 350 through filter circuit 320 and rectifier circuit 330.

Figure 2:
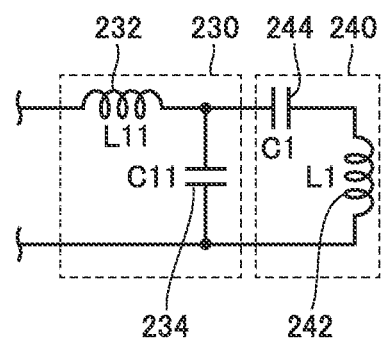
FIG. 2 is a diagram showing an example of a circuit configuration of a filter circuit and a power transmitting unit of a power transmitting device.

FIG. 2 is a diagram showing an example of a circuit configuration of filter circuit. 230 and power transmitting unit 240 of power transmitting device 10. Filter circuit 230 is composed of an LC filter including a coil 232 and a capacitor 234. Hereinafter, coil 232 has inductance of "L11" and capacitor 234 has capacitance of "C11" for the sake of illustration.

Power transmitting unit 240 includes a power transmitting coil 242 and a capacitor 244. Capacitor 244 is provided to compensate for a power factor of power to be transmitted and is connected to power transmitting coil 242 in series. Hereinafter, power transmitting coil 242 has inductance of "L1" and capacitor 244 has capacitance of "C1" for the sake of illustration.

Power transmitting device 10 including filter circuit 230 and power transmitting unit 240 has a resonant frequency determined by inductance L11 of coil 232, capacitance C11 of capacitor 234, inductance L1 of power transmitting coil 242, and capacitance C1 of capacitor 244.

Figure 3:
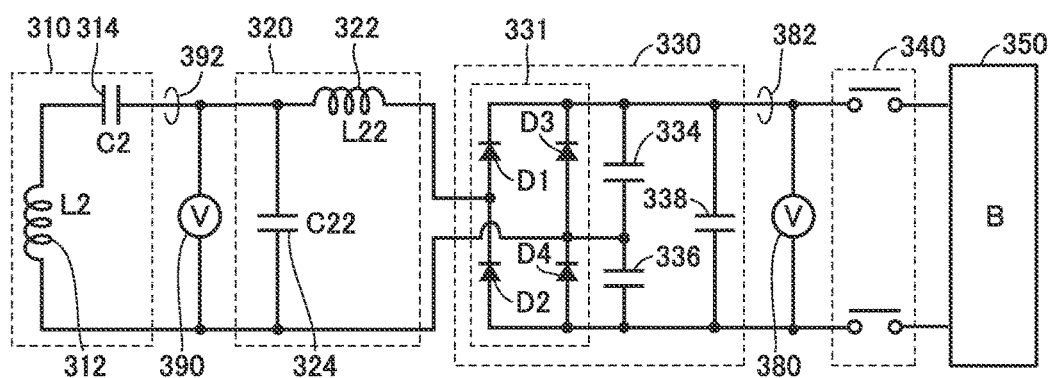
FIG. 3 is a diagram showing an example of a circuit configuration of a power receiving device.

FIG. 3 is a diagram showing an, example of a circuit configuration of power receiving device 20. As has been set forth above, power receiving device 20 includes power receiving unit 310, filter circuit 320, rectifier circuit 330, charging relay 340, and power storage device 350.

Power receiving unit 310 includes a power receiving coil 312 and a capacitor 314. Capacitor 314 is provided to compensate for a power factor of power received and is connected to power receiving coil 312 in series. Hereinafter, power receiving coil 312 has inductance of "L2" and capacitor 314 has capacitance of "C2" for the sake of illustration.

Filter circuit 320 is composed of an LC filter including a coil 322 and a capacitor 324. Hereinafter, coil 322 has inductance of "L22" and capacitor 324 has capacitance of "C22" for the sake of illustration.

Power receiving device 20 including power receiving unit 310 and filter circuit 320 has a resonant frequency determined by inductance L2 of power receiving coil 312, capacitance C2 of capacitor 314, inductance L22 of coil 322, and capacitance C22 of capacitor 324.

Rectifier circuit 330 includes a bridge circuit 331 including four diodes D1 to D4, and capacitors 334, 336 and 338. Capacitors 334 and 336 are connected between bridge circuit 331 and power storage device 350 in series between the positive electrode of power storage device 350 and the negative electrode of power storage device 350. Adopting such a voltage doubler rectifier circuit allows rectifier circuit 330 to increase voltage. Capacitor 338 is connected between the positive electrode of power storage device 350 and the negative electrode of power storage device 350, and smoothes the voltage output from rectifier circuit 330 to power storage device 350.

<Power Receiving Preparation Process>

Power supply ECU 250 of power transmitting device 10 periodically outputs a broadcast signal from communication unit 260. The broadcast signal is transmitted in an area within a predetermined distance (for example of about several meters) from communication unit 260.

Upon receiving the broadcast signal from power transmitting device 10, charging ECU 360 of power receiving device 20 returns to power transmitting device 10 a reply indicating that the broadcast signal has been received. Thus, wireless communication between power transmitting device 10 and power receiving device 20 is established.

Once wireless communication with power transmitting device 10 has been established, charging ECU 360 of power receiving device 20 cooperates with power supply ECU 250 of power transmitting device 10 to perform a process for starting receiving power (hereinafter also referred to as a "power receiving preparation process"). As the power receiving preparation process, charging ECU 360 performs "fine positioning," "pairing," "initial alignment check," and "final, compatibility check" in this order.

Once wireless communication with power transmitting device 10 has been established, charging ECU 360 initially performs "fine positioning." In the "fine positioning," charging ECU 360 cooperates with power transmitting device 10 to obtain a relative positional relationship of power receiving unit 310 with respect to power transmitting unit 240, and notifies a user of a vehicle or the like having power receiving device 20 mounted therein of the obtained positional relationship. This can guide the user to positionally align power receiving unit 310 with power transmitting unit 240.

After the fine positioning is completed, charging ECU 360 performs "pairing." In the "pairing," charging ECU 360 cooperates with power transmitting device 10 to uniquely identify power transmitting device 10.

After the pairing is completed, charging ECU 360 performs "initial alignment check." In the "initial alignment check," charging ECU 360 cooperates with the paired power transmitting device 10 to determine whether power receiving unit 310 is present at a reference position facing power transmitting unit 240 of the paired power transmitting device 10.

Once it has been confirmed through the initial alignment check that power receiving unit 310 is present at the reference position, charging ECU 360 performs "final compatibility check." In the "final compatibility check," charging ECU 360 obtains compatibility information of power transmitting device 10 from the paired power transmitting device 10, compares the obtained compatibility information of power transmitting device 10 and compatibility information of power receiving device 20, and determines therefrom whether receiving power from the paired power transmitting device 10 is allowed.

Once it has been confirmed through the final compatibility check that receiving power is allowed, charging ECU 360 closes charging relay 340 to connect power storage device 350 and rectifier circuit 330, and outputs a power request (a power transmission request signal) to the paired power transmitting device 10 to request power transmitting device 10 to transmit power. Thus, power transmitting device 10 starts transmitting power and power receiving device 20 starts receiving power.

<Short Circuit Determination Process>

In power receiving device 20 as described above, when any component included in rectifier circuit 330 has a short circuit fault, power receiving unit 310 and rectifier circuit 330 will be short-circuited.

When power receiving unit 310 receives power from power transmitting unit 240 in a state in which rectifier circuit 330 has a short circuit fault, an excessive current flows between power receiving unit 310 and rectifier circuit 330, which may have an effect to cause a component other than rectifier circuit 330 (for example, power receiving unit 310 or filter circuit 320 or the like) to also fail.

Figure 4:
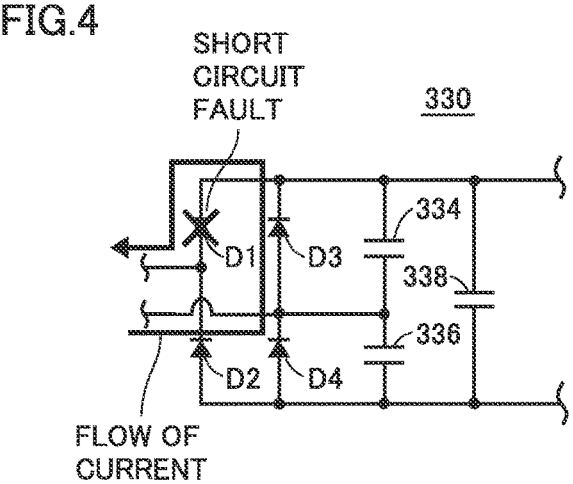
FIG. 4 is a diagram showing a path of a current flowing through a rectifier circuit of the power receiving device when the power receiving unit receives power from the power transmitting unit in a state where a diode D1 of the rectifier circuit has a short circuit fault.

FIG. 4 is a diagram showing a path of a current flowing through rectifier circuit 330 when power receiving unit 310 receives power from power transmitting unit 240 in a state where a diode D1 of rectifier circuit 330 has a short circuit fault. As shown in FIG. 4, when power receiving unit 310 receives power in a state in which diode D1 has a short circuit fault, a current from power receiving unit 310 flows through diode D3 in a forward direction, and is returned through the short-circuited and faulty diode D1 to power receiving unit 310. At the time, a resistance component between power receiving unit 310 and rectifier circuit 330 is very small, and accordingly, an excessively large current can flow between power receiving unit 310 and rectifier circuit 330. When power receiving unit 310 receives power from power transmitting unit 240 in a state in which rectifier circuit 330 has a short circuit fault, the short circuit fault of rectifier circuit 330 may cause power receiving unit 310, filter circuit 320 or other components than rectifier circuit 330 to also fail.

In view of the above problem, once wireless communication with power transmitting device 10 has been established, charging ECU 360 according to the present embodiment initially performs the above described "fine positioning," "pairing," "initial alignment check," and "final compatibility check" sequentially. Then, when it is determined through the final compatibility check that receiving power from power transmitting device 10 is allowed, then, before outputting a power request to power transmitting device 10, charging ECU 360 closes charging relay 340, and uses a value of a voltage sensed by voltage sensor 390 with charging relay 340 closed (i.e., a voltage output from power receiving unit 310) to determine whether rectifier circuit 330 has a short circuit fault, i.e., to perform a "short-circuit determination process."

Figure 5:
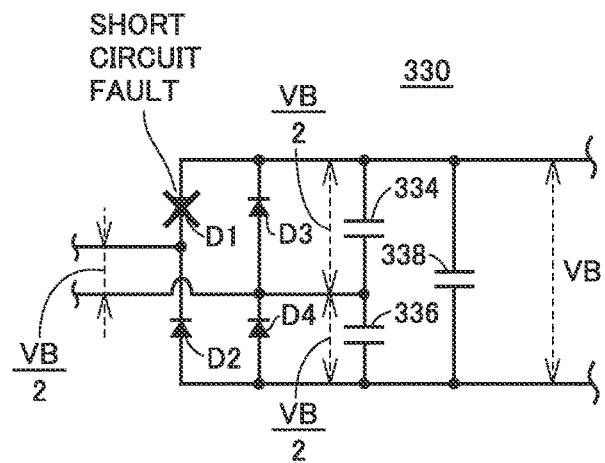
FIG. 5 is a diagram showing voltages applied to components of the rectifier circuit of the power receiving device when a charging relay is closed in a state where diode D1 of the rectifier circuit has a short circuit fault.

FIG. 5 is a diagram showing voltages applied to components of rectifier circuit 330 when charging relay 340 is closed in a state where diode D1 of rectifier circuit 330 has a short circuit fault. In FIG. 5, an example is shown in which the capacitance of capacitor 334 and the capacitance of capacitor 336 have the same values.

When charging relay 340 is closed, rectifier circuit 330 and power storage device 350 are connected, and a voltage VB of power storage device 350 is applied to a power line on the side of the output of rectifier circuit 330 (i.e., a power line between rectifier circuit 330 and charging relay 340). As a result, a voltage across capacitor 338 is "VB." Furthermore, a voltage across capacitor 334 and that across capacitor 336 are both "VB/2."

When diode D1 normally operates, diode D1 acts so that no current flows from the output side of rectifier circuit 330 to the input side of rectifier circuit 330, and voltage "VB/2" across capacitor 334 is not applied to a power line on the side of the input of rectifier circuit 330 (i.e., a power line between rectifier circuit 330 and filter circuit 320). Accordingly, voltage sensor 390 senses a value of substantially "0" (that is, the voltage output from power receiving unit 310 is substantially "0").

In contrast, as shown in FIG. 5, when diode D1 has a short circuit fault, voltage "VB/2" across capacitor 334 is applied to the power line on the side of the input of rectifier circuit 330. Accordingly, voltage sensor 390 senses a value of substantially "VB/2" rather than "0" (that is, power receiving unit 310 outputs a voltage of "VB/2" rather than "0"). Using such a principle, charging ECU 360 determines whether rectifier circuit 330 has a short circuit fault. For example, charging ECU 360 sets a voltage between "0" and "VB/2" as a threshold voltage, and when voltage sensor 390 senses a voltage having a value exceeding the threshold voltage with charging relay 340 closed, charging ECU 360 determines that rectifier circuit 330 has a short circuit fault.

Note that a similar principle can also be used to determine a short-circuit fault when rectifier circuit 330 has any one of diode D2, diode D3, diode D4, capacitor 334, and capacitor 336 short-circuited and thus being faulty.

Thus, according to the present embodiment, before outputting a power request to power transmitting device 10, charging ECU 360 closes charging relay 340, and also uses a value of a voltage sensed by voltage sensor 390 with charging relay 340 closed to perform the short-circuit determination process. Thus whether rectifier circuit 330 has a short circuit fault can be determined in a state in which power receiving unit 310 does not receive power from power transmitting device 10. Thus, when performing the short-circuit determination process, if rectifier circuit 330 should have a short circuit fault, there is no excessively large current flowing between power receiving unit 310 and rectifier circuit 330, and a component other than rectifier circuit 330 (such as power receiving unit 310 or filter circuit 320, etc.) can be prevented from failing as rectifier circuit 330 has the short circuit fault.

<Process Flow>

Figure 6:
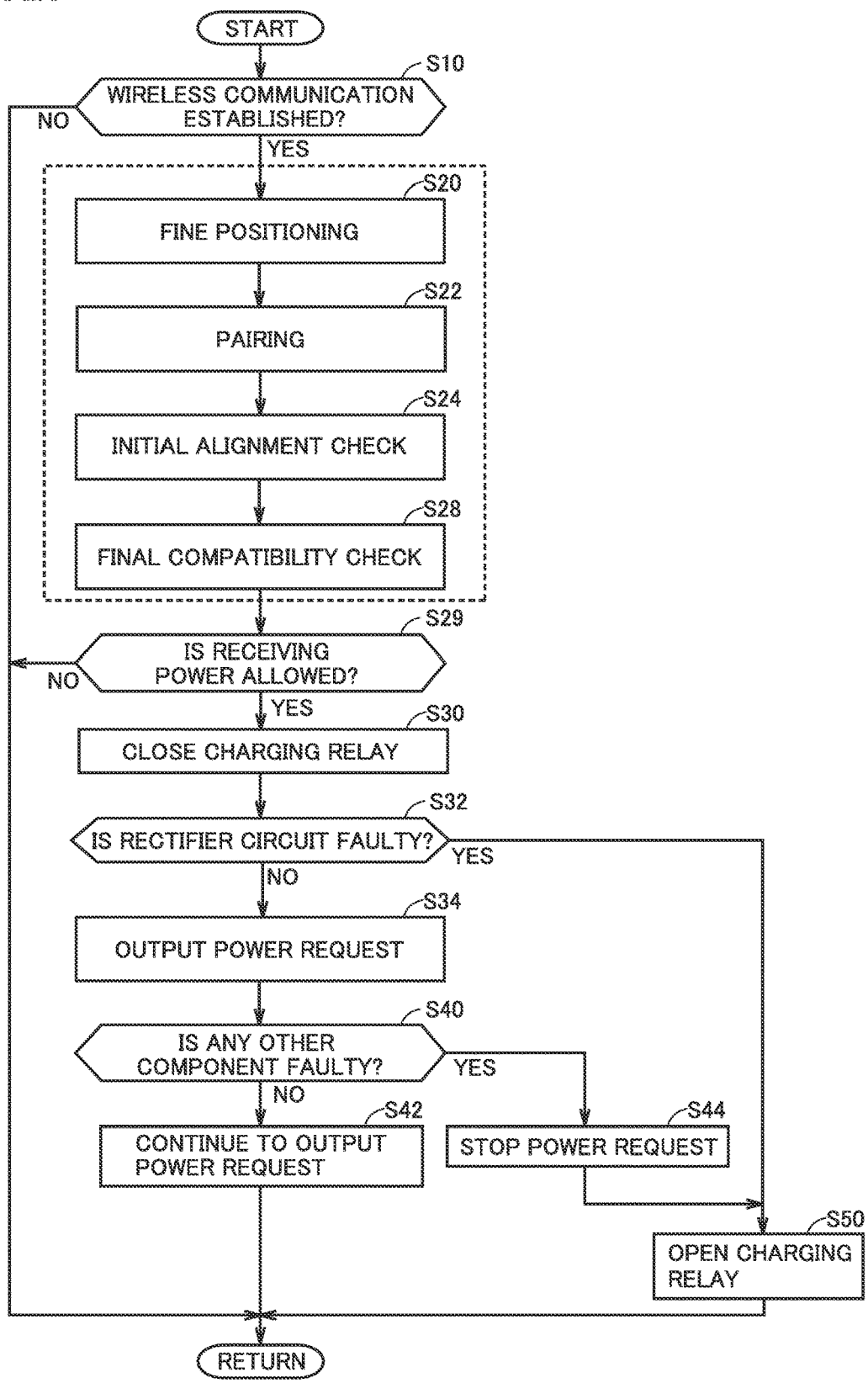
FIG. 6 is a diagram (No. 1) showing an example of a procedure of a process performed by a charging ECU.

FIG. 6 is a diagram showing an example of a procedure of a process performed when charging ECU 360 of power receiving device 20 performs the power receiving preparation process and the short-circuit determination process. This flowchart is repeatedly executed periodically as predetermined.

Initially, charging ECU 360 determines whether wireless communication with power transmitting device 10 is established (step S10).

Once wireless communication with power transmitting device 10 has been established (YES in step S10), charging ECU 360 performs the above power receiving preparation process in steps S20 to S28. Specifically, charging ECU 360 initially performs "fine positioning" (step S20). After the fine positioning is completed, charging ECU 360 performs "pairing" (step S22). After the pairing is completed, charging ECU 360 performs "initial alignment check" (step S24). When it is confirmed through the initial alignment check that power receiving unit 310 is present at a reference position, charging ECU 360 performs "final compatibility check" (step S28).

As a result of the final compatibility check, charging ECU 360 determines whether receiving power from power transmitting device 10 is allowed (step S29). If not, (NO in step S29), charging ECU 360 skips a subsequent process and shifts the current process to a return.

On the other hand, when it is determined that receiving power from power transmitting device 10 is allowed (YES in step S29), charging ECU 360 closes charging relay 340 (that is, switches it from an open state to a closed state) to connect power storage device 350 and rectifier circuit 330 (step S30).

Subsequently, charging ECU 360 performs the short circuit determination process for rectifier circuit 330 (step S32). Specifically, as has been described above with reference to FIG. 5, charging ECU 360 uses a value of a voltage sensed by voltage sensor 390 with charging relay 340 closed (i.e., a voltage output from power receiving unit 310) to determine whether rectifier circuit 330 has a short circuit fault.

If rectifier circuit 330 has a short circuit fault (YES in step S32), charging ECU 360 opens charging relay 340 (that is, switches it from the closed state to the open state) to disconnect power storage device 350 from rectifier circuit 330 (Step S50).

In contrast, when rectifier circuit 330 does not have a short circuit fault (NO in step S32), charging ECU 360 outputs a power request to power transmitting device 10 (step S34). Accordingly, power transmitting device 10 starts transmitting power and power receiving device 20 starts receiving power.

When power transmitting device 10 starts transmitting power and power receiving device 20 starts receiving power in response to the power request being output, charging ECU 360 determines whether any component other than rectifier circuit 330 is faulty (step S40). For example, charging ECU 360 uses a value of a current sensed by current sensor 382 (a current output from rectifier circuit 330) and a value of a current sensed by current sensor 392 (a current output from power receiving unit 310) to determine whether coil 322 has an open circuit fault. Furthermore, charging ECU 360 uses a value of a voltage sensed by voltage sensor 390 (a voltage output from power receiving unit 310) and a value of a current sensed by current sensor 392 (a current output from power receiving unit 310) to determine whether capacitor 324 has a short circuit fault. Furthermore, charging ECU 360 obtains from power transmitting device 10 a value of a current sensed by current sensor 274 (a current flowing to power transmitting unit 240) and uses the obtained value and the value of the current sensed by current sensor 392 (the current output from power receiving unit 310) to determine whether power receiving unit 310 has at least one of power receiving coil 312 and capacitor 314 having an open circuit fault.

If there is no other faulty component (NO in step S40), charging ECU 360 continues to output the power request (step S42). Thus, power transmitting device 10 continues to transmit power and power receiving device 20 continues to receive power, and power storage device 350 is thus charged.

If any other component is faulty (YES in step S40), charging ECU 360 stops outputting the power request (step S44). Thus, power transmitting device 10 stops transmitting power and power receiving device 20 stops receiving power. Subsequently, charging ECU 360 opens charging relay 340 (that is, switches it from the closed state to the open state) to disconnect power storage device 350 from rectifier circuit 330 (step S50).

Thus, according to the present embodiment, before outputting a power request to power transmitting device 10, charging ECU 360 closes charging relay 340, and also uses a value of a voltage sensed by voltage sensor 390 with charging relay 340 closed to perform the short-circuit determination process for rectifier circuit 330. Thus whether rectifier circuit 330 has a short circuit fault can be determined in a state in which power receiving unit 310 does not receive power from power transmitting device 10. Thus, when performing the short-circuit determination process for rectifier circuit 330, if rectifier circuit 330 should have a short circuit fault, there is no excessively large current flowing between power receiving unit 310 and rectifier circuit 330, and a component other than rectifier circuit 330 (such as power receiving unit 310 or filter circuit 320, etc.) can be prevented from failing as rectifier circuit 330 has the short circuit fault.

Furthermore, according to the present embodiment, after wireless communication with power transmitting device 10 is established, charging ECU 360 closes charging relay 340 to perform the short circuit determination process for rectifier circuit 330, and when rectifier circuit 330 does not have a short circuit fault, charging ECU 360 keeps charging relay 340 closed even after the short circuit determination process is completed, while charging ECU 360 continues to output the power request to power transmitting device 10 to charge power storage device 350. This allows charging relay 340 to be operated less frequently than when charging relay 340 is re-opened whenever the short-circuit determination process for rectifier circuit 330 is completed. This allows charging relay 340 to have an increased lifetime.

Furthermore, according to the present embodiment, charging ECU 360 closes charging relay 340 to perform the short-circuit determination process for rectifier circuit 330 after wireless communication with power transmitting device 10 is established and it is also determined through the final compatibility check that receiving power from power transmitting device 10 is allowed. This allows charging relay 340 to be operated further less frequently.

Specifically, when wireless communication with power transmitting device 10 is established, and despite that, it is not determined through the final compatibility check that receiving power from power transmitting device 10 is allowed, receiving power from power transmitting device 10 is not allowed to be started. If the short-circuit determination process for rectifier circuit 330 is performed before the final compatibility check and it is determined through the short-circuit determination process that rectifier circuit 330 does not have a short circuit fault, and thereafter the final compatibility check is performed and it is determined therethrough that receiving power is not allowed, then, charging relay 340 once closed for the short-circuit determination process needs to be re-opened and would thus be operated more frequently.

Furthermore, according to the present embodiment, charging ECU 360 closes charging relay 340 to perform the short-circuit determination process for rectifier circuit 330 after wireless communication with power transmitting device 10 is established and it is also determined through the final compatibility check that receiving power is allowed. This allows charging relay 340 to be operated less frequently than when the short-circuit determination process for rectifier circuit 330 is performed before the final compatibility check.

Exemplary Variation

In the above-described embodiment, an example has been described in which the short circuit determination process for rectifier circuit 330 is performed after the power receiving preparation process is completed (that is, after it is determined through the final compatibility check that receiving power is allowed).

However, when the short circuit determination process for rectifier circuit 330 is performed may be any time before a power request is output, and it is not necessarily limited to a time after the power receiving preparation process is completed. For example, the short circuit determination process for rectifier circuit 330 may be performed before the power receiving preparation process is started.

Figure 7:
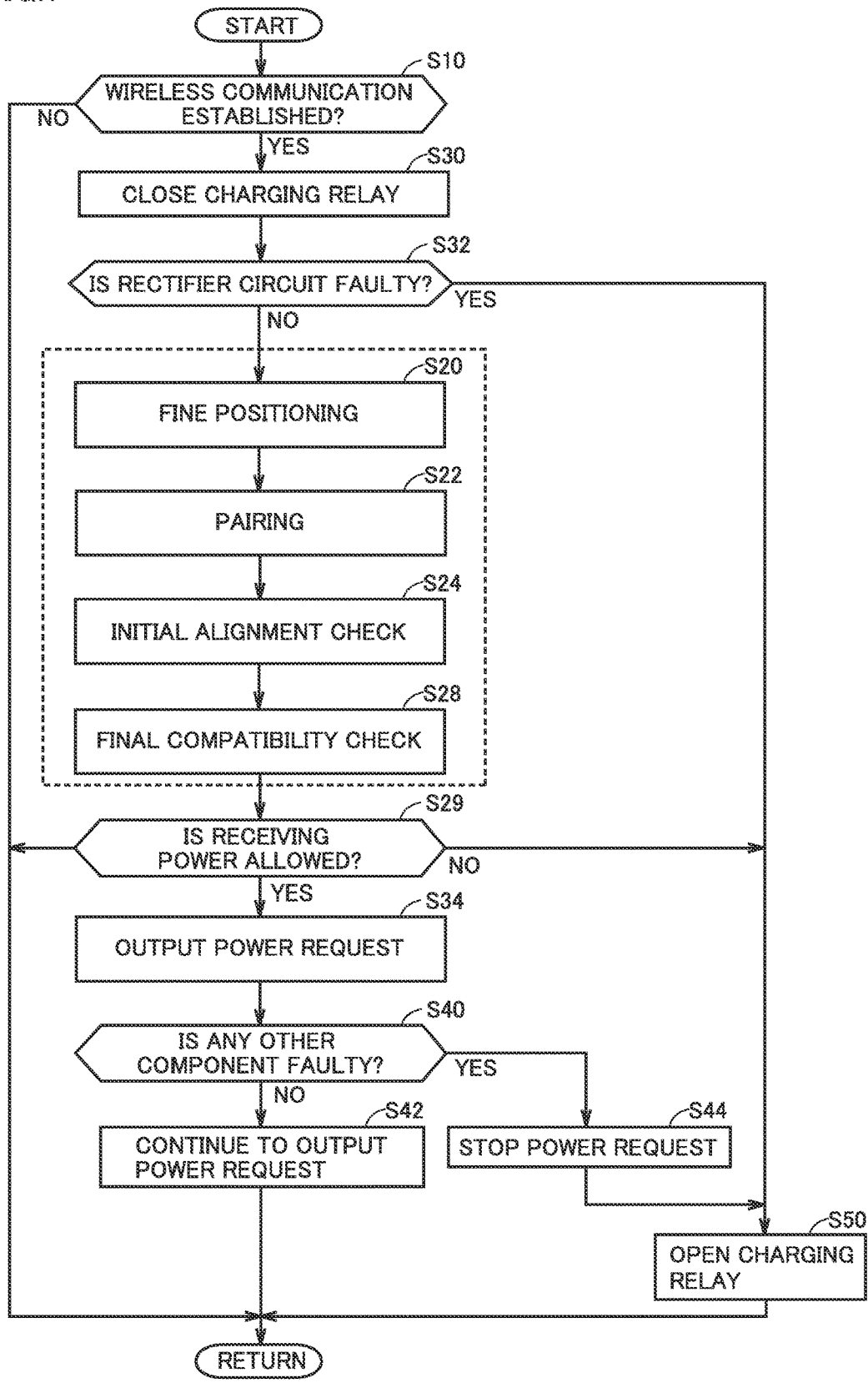
FIG. 7 is a diagram (No. 2) showing an example of a procedure of a process performed by the charging ECU.

FIG. 7 is a diagram showing an example of a procedure of a process performed when charging ECU 360 according to the present exemplary variation performs the power receiving preparation process and the short-circuit determination process. The flowchart of FIG. 7 differs from the flowchart of FIG. 6 in when the short circuit determination process (more specifically, steps S30 and S32) is performed. Specifically, in FIG. 6 described above, the short circuit determination process (more specifically, steps S30 and S32) is performed after the power receiving preparation process (steps S20 to S28) is completed, whereas in FIG. 7, the short circuit determination process is performed before the power receiving preparation process starts.

More specifically, once wireless communication with power transmitting device 10 has been established (YES in step S10), then, before performing the power receiving preparation process (steps S20 to S28), charging ECU 360 closes charging relay 340 (step S30) and performs the short-circuit determination process for rectifier circuit 330 (step S32).

When it is determined through the short-circuit determination process that rectifier circuit 330 does not have a short circuit fault (NO in step S32), charging ECU 360 performs the power receiving preparation process (steps S20 to S28), and when it is determined through the power receiving preparation process that receiving power from power transmitting device 10 is allowed (YES in step S29), charging ECU 360 outputs a power request to power transmitting device 10 (step S34). If it is not determined through the power receiving preparation process that receiving power from power transmitting device 10 is allowed (NO in step S29), charging ECU 360 opens charging relay 340 to disconnect power storage device 350 from rectifier circuit 330 (step S50).

Thus, when the short circuit determination process for rectifier circuit 330 is performed may be a time before the power receiving preparation process is started in so far as the time is a time before a power request is output. This also allows whether rectifier circuit 330 has a short circuit fault to be determined in a state in which power receiving unit 310 does not receive power from power transmitting device 10, and a component other than rectifier circuit 330 can be prevented from failing as rectifier circuit 330 has a short circuit fault.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A wireless power receiving device comprising:
    a power receiving unit configured to wirelessly receive power from a power transmitting unit of a power transmitting device;
    a rectifier circuit configured to rectify the power received by the power receiving unit and output the rectified power to a power storage device;
    a charging relay provided between the rectifier circuit and the power storage device;
    a voltage sensor configured to sense a voltage on a power line between the power receiving unit and the rectifier circuit; and
    a controller configured to wirelessly communicate with the power transmitting device via a communication device,
    the controller being configured to, after wireless communication with the power transmitting device is established before a power transmission request signal as a signal for requesting the power transmitting device to transmit power is output to the power transmitting device, close the charging relay, and also perform a short-circuit determination process, by using a value of a voltage sensed by the voltage sensor with the charging relay closed, to determine whether the rectifier circuit has a short circuit fault.

2. The wireless power receiving device according to claim 1, wherein the controller is configured to:
    when it is determined through the short-circuit determination process that the rectifier circuit has a short circuit fault, open the charging relay without outputting the power transmission request signal to the power transmitting device; and
    when it is not determined through the short-circuit determination process that the rectifier circuit has a short circuit fault, output the power transmission request signal to the power transmitting device while keeping the charging relay closed.

3. The wireless power receiving device according to claim 1, wherein the controller is configured to, after wireless communication with the power transmitting device is established, perform a final compatibility check to obtain compatibility information of the power transmitting device from the power transmitting device and to determine whether receiving power from the power transmitting device is allowed, and after it is determined through the final compatibility check that receiving power is allowed, close the charging relay to perform the short circuit determination process.

* * * * *

UNITED STATES PATENT AND TRADEMARK OFFICE
CERTIFICATE OF CORRECTION

PATENT NO. : 10,505,362 B2
APPLICATION NO. : 16/029077
DATED : December 10, 2019
INVENTOR(S) : Takahiro Misawa and Toshiya Hashimoto It is certified that error appears in the above-identified patent and that said Letters Patent is hereby corrected as shown below:

In the Specification

In Column 4, Line 23, after "noise", delete ",".

In Column 6, Line 62, after "circuit", delete ".".

In Column 7, Line 13, after "an", delete ",".

In Column 7, Line 65, after "final", delete ",".

Signed and Sealed this
Fourth Day of February, 2020

Andrei Iancu
*Director of the United States Patent and Trademark Office*